United States Patent

Martin et al.

[11] Patent Number: 5,641,268
[45] Date of Patent: Jun. 24, 1997

[54] AEROFOIL MEMBERS FOR GAS TURBINE ENGINES

[75] Inventors: Terence E. Martin, Derbyshire; Hang W. Lung, Derby, both of England

[73] Assignee: Rolls-Royce plc, London, England

[21] Appl. No.: 599,111

[22] Filed: Feb. 9, 1996

Related U.S. Application Data

[63] Continuation of Ser. No. 128,084, Sep. 29, 1993, abandoned, which is a continuation-in-part of Ser. No. 946,057, Sep. 16, 1992, abandoned.

[30] Foreign Application Priority Data

Sep. 17, 1991 [GB] United Kingdom ............... 9119846

[51] Int. Cl.⁶ ........................................... F01D 9/00
[52] U.S. Cl. ................ 415/191; 416/223 A; 416/DIG. 5
[58] Field of Search ........................ 416/223 R, 223 A, 416/DIG. 1, DIG. 2, DIG. 5; 415/191

[56] References Cited

U.S. PATENT DOCUMENTS

| | | | |
|---|---|---|---|
| 4,686,796 | 8/1987 | Giebmanns | 416/223 A |
| 4,720,239 | 1/1988 | Owczarek | 416/223 A |
| 4,900,230 | 2/1990 | Patel | 416/223 A |
| 5,393,198 | 2/1995 | Noda et al. | 416/223 A |

Primary Examiner—John T. Kwon
Attorney, Agent, or Firm—Cushman Darby & Cushman Intellectual Property Group Of Pillsbury Madison & Sutro LLP

[57] ABSTRACT

Aerofoil members such as the stator vanes and rotor blades of an axial flow compressor are defined by a number of nominal sections. The leading edge of each nominal section of the blade is set so that an airflow passing therethrough is incident at the optimum angle. The optimum angle is chosen so that the maximum velocities of the airflow at the leading edge are equal. Once the optimum angle has been found for each section of the blade the sections are stacked to define a blade having a leading edge the aerodynamic profile of which ensures that the airflow is incident at the optimum angle along the length of the blade from the root to the tip. The efficiency of the axial flow compressor is improved.

6 Claims, 5 Drawing Sheets

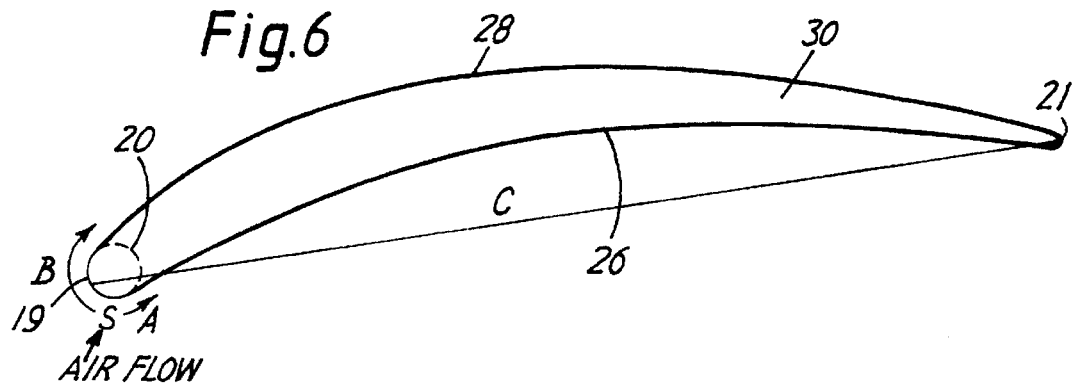
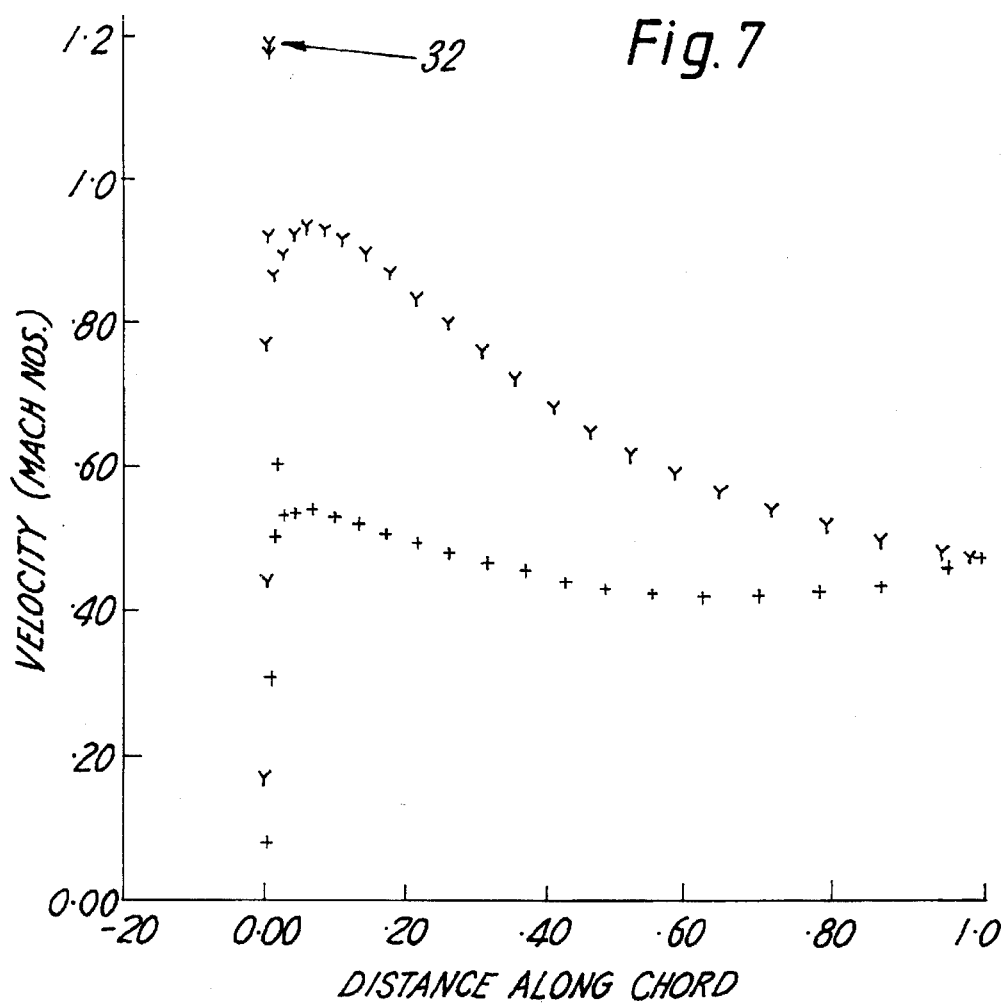

AEROFOIL MEMBERS FOR GAS TURBINE ENGINES

This is a continuation of application Ser. No. 08/128,084, filed Sep. 29, 1993, which was abandoned upon the filing hereof and which is a continuation in part of application Ser. No. 07/946,057, filed Sep. 16, 1992, now abandoned.

FIELD OF THE INVENTION

The present invention relates to aerofoil members of the type which are commonly used in gas turbine engines. These members include the rotor blades and stator vanes of an axial flow compressor in a gas turbine engine.

BACKGROUND OF THE INVENTION

In a gas turbine engine compression of the air is effected by an axial flow compressor. The axial flow compressor is a multi-stage unit employing alternate rows of rotating (rotor) blades and stationary (stator) vanes. The function of the rotor blades and stator vanes is to accelerate and diffuse the air until the required pressure rise is obtained.

The rotor blades and stator vanes are arranged in rows which are circumferentially disposed. Each row of rotor blades directs the air passing therethrough from the immediately upstream row of stator vanes to the immediately downstream row of stator vanes. Each row of stator vanes redirects the air at an angle to the next row of rotor blades. The preferred angle of entry of the air into each row of rotor blades depends on the speed of rotation and the velocity vector of the air approaching each row.

To optimise the air flow distribution within the axial flow compressor the rotor blades and stator vanes are designed so that the airflow enters each row at a preferred angle. They are designed so that the angle at which the airflow is incident at the leading edge of the rotor blades or stator vanes is such that the airflow does not have to turn abruptly. At the correct angle the airflow turns smoothly attaching to the surfaces of the rotor blades and stator vanes. This minimises the aerodynamic losses and enables the axial flow compressor to work efficiently.

The angle of the airflow for each row has traditionally been set by experience using correlations derived from experimental test data. The experimental test data is used to set the angle, at a nominal mid-height position on the leading edge of the rotor blades or stator vanes. The angle of the airflow at the mid-height position is set to minimise the aerodynamic losses. Since the angle at which the airflow is incident at the leading edge is only set at the mid-height position aerodynamic losses are experienced at other positions along the leading edge of the rotor blades or stator vanes radially above and below the mid-height position.

SUMMARY OF THE INVENTION

The present invention seeks to provide rotor blades or stator vanes, for use in an axial flow compressor of a gas turbine engine, in which the angle at which the airflow is incident at the leading edge is set at a number of positions along the leading edge of each of the rotor blades or stator vanes. The aerodynamic profile of the leading edge of the rotor blades or stator vanes also improves the axial efficiency of the axial flow compressor.

According to the present invention provides an aerofoil for use in an axial flow compressor of a gas turbine engine, the aerofoil having an aerodynamic profile defined by a plurality of nominal sections stacked in a plane normal to a longitudinal axis of the engine, each section having a pressure surface and a suction surface and being arranged so that in operation a proportion of a flow of air passing through the engine is incident on an arc of a circle at the leading edge of each section, the sections are disposed to define an aerofoil which has a leading edge profile such that at a predetermined engine operating speed the proportion of the flow of air which is incident on the leading edge circles of each section is incident at an angle at which the airflow divides so that the maximum velocity of the airflow at the leading edge circle which subsequently flows over the pressure surface of each section is equal to the maximum velocity of the airflow at the leading edge circle which subsequently flows over the suction surface of each section. By nominal section is meant a virtual portion of the aerofoil, the height of which is a proportion of the overall height of the entire aerofoil.

The pressure surface of each section defining the aerofoil is concave and the suction surface of each section defining the aerofoil is convex.

The aerofoil may be a blade or a vane, the vane may be variable.

Preferably a plurality of aerofoils are arranged in a circumferential array to define a stage of an axial flow compressor.

BRIEF DESCRIPTION OF THE DRAWINGS

The present invention will now be described with reference to the accompanying drawings in which:

FIG. 6 is a cross-sectional view of one of the radial sections of the blade shown in FIG. 2 in which the air incident on the leading edge has a high positive incidence.

FIG. 7 is a plot of the velocity distribution of the air around the radial section of the blade shown in FIG. 6.

DETAILED DESCRIPTION OF THE INVENTION

Figure 1:
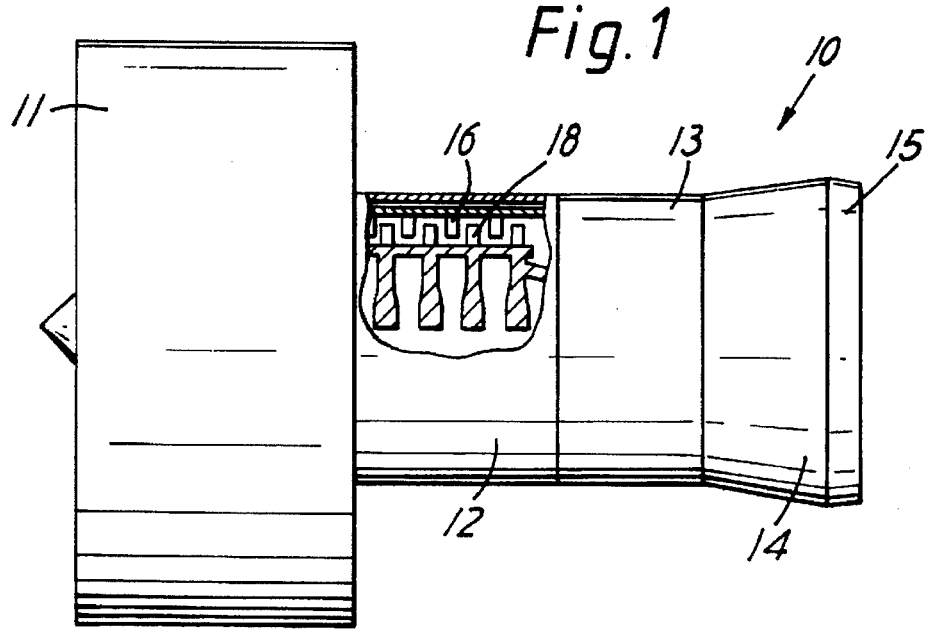
FIG. 1 is a schematic view of a gas turbine engine which is partially broken away to show a cross-sectional view of part of an axial flow compressor.

Referring to FIG. 1 a gas turbine engine generally indicated at 10 comprises a ducted fan 11, a compressor 12, combustion equipment 13 and a turbine 14 in axial flow series. The engine operates in a conventional manner so that the air is compressed by the fan 11 and compressor 12 before being mixed with fuel and the mixture combusted in the combustion equipment 13. The combustion products then expand through the turbine 14, which drive the fan 11 and the compressor 12, before being exhausted through a propulsion nozzle 15.

The compressor 12 has alternate rows of stationary (stator) vanes 16 and rotating (rotor) blades 18. The pressure of the airflow is raised as it passes through the series of alternating rows of stator vanes 16 and rotor blades 18. The air discharges from each row of rotor blades 18 to a row of stator vanes 16 further downstream. The stator vanes 16 redirect the airflow to a preferred angle for entering the succeeding row of blades 18.

Figure 2:
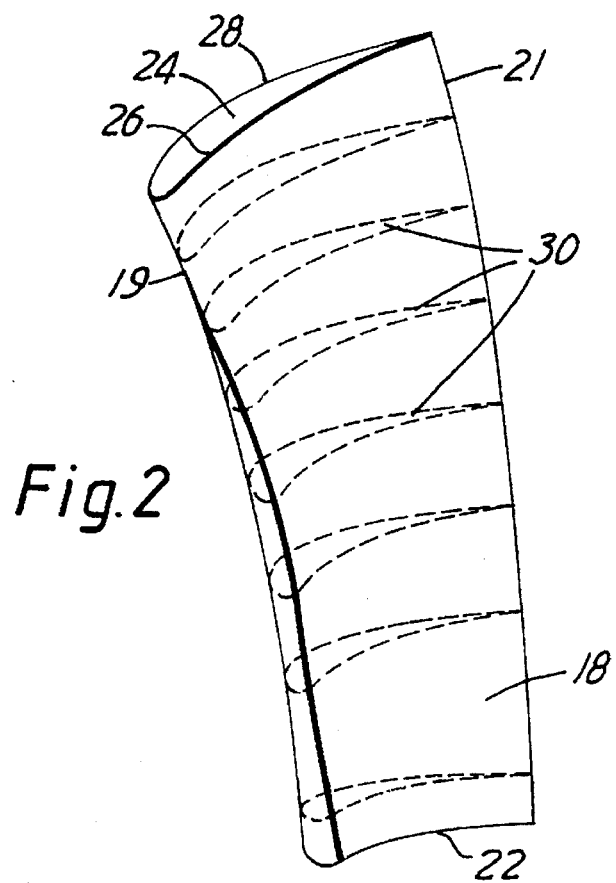
FIG. 2 is a pictorial view of a compressor rotor blade showing a number of radial sections.

The preferred angle at which the airflow should enter the blade rows varies axially along the length of the compressor 12 as well as radially along leading edge 19, FIG. 2, of each of the blades 18 in the row. To ensure that the air is incident at the correct angle along the leading edge 19 of the blades each blade 18 is twisted from root 22 to tip 24. The amount of twist required depends on the speed of rotation of the blade and the velocity vector of the air approaching the leading edge 19.

Figure 3:
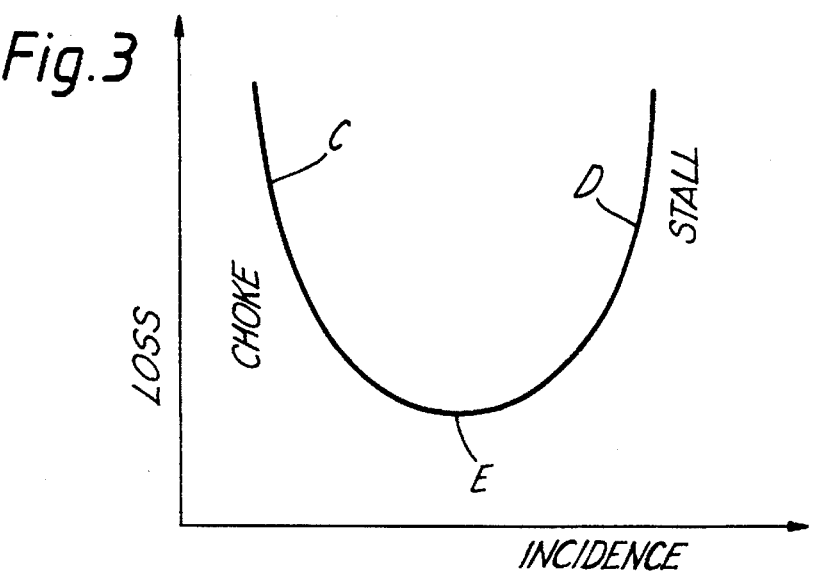
FIG. 3 is a graph showing losses verses incidence for air incident on the leading edge of a compressor rotor blade shown in FIG. 2.

Each blade 18 should be designed so that the angle at which the airflow is incident on the leading edge 19 of the blade 18 is such that the air does not turn abruptly around the leading edge 19. If the air has to turn abruptly around the leading edge 19 of the blade 18 the aerodynamic losses increase and the air may stall or choke, regions C and D in FIG. 3. When the air is incident at the leading edge 19 of the blade 18 at the optimum angle the airflow turns smoothly attaching to a concave pressure surface 26 and a convex suction surface 28 of the blade 18. The aerodynamic losses are minimised, region E in FIG. 3, and the blade 18 works efficiently.

To design the blades 18 so that the airflow is incident at the correct angle radially along the leading edge 19, a computer model of each blade 18 is divided into a number of nominal radial sections 30, FIG. 2. A nominal circle 20 is fitted to the leading edge 19 of each of the sections 30 of the model of the blade 18. Each of the blade sections 30 is aerodynamically analysed using a quasi 3D blade to blade computer program. The program solves the potential flow equation using a finite element model to produce a plot of the velocity distribution of the air around each radial section 30 of the blade 18.

Figure 4:
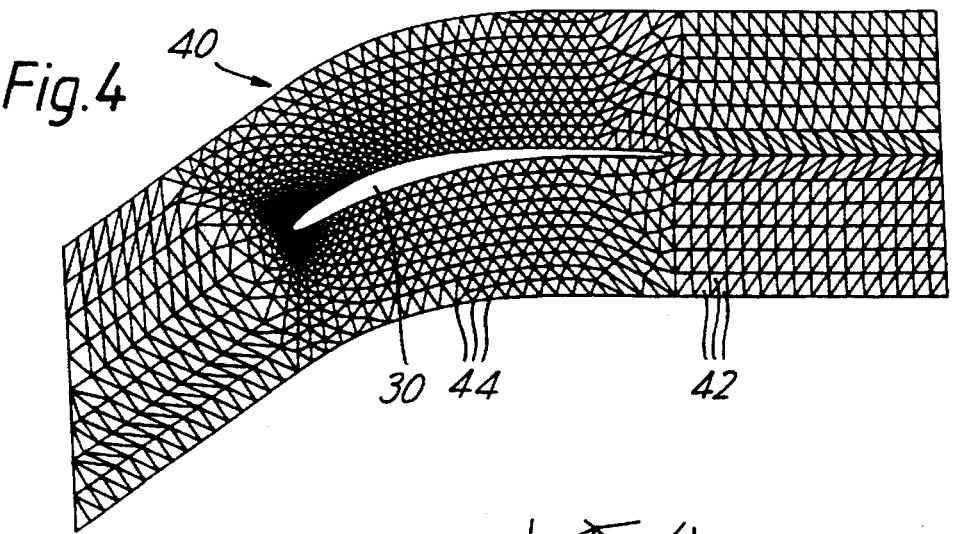
FIG. 4 is a finite element mesh, generated by computer in the passageway around one of the radial sections of the blade shown in FIG. 2.

A finite element mesh, generally indicated at 40, is generated by the computer program in the passageway around one of the sections 30, FIG. 4. The mesh 40 is constructed of triangular elements 42 and nodes 44 using Galerkin's method. In generating the mesh 40 the computer program takes into account the number of blades in the rotor stage, the space chord, the thickness chord, the leading edge radius and the camber line. The coarseness of the mesh 40, the number of nodes 44 and the distribution of the nodes 44 can be controlled by adjusting the mesh construction parameters interactively.

The computer program then solves the full potential equation using the assumptions that the airflow is inviscid, adiabatic, isotropic and irrotational. For each node 44 a shape function is chosen and the governing potential flow equation multiplied by this. This function is then integrated over all the elements surrounding the node 44 and this is repeated for all the nodes 44 in the mesh 40.

Figure 5:
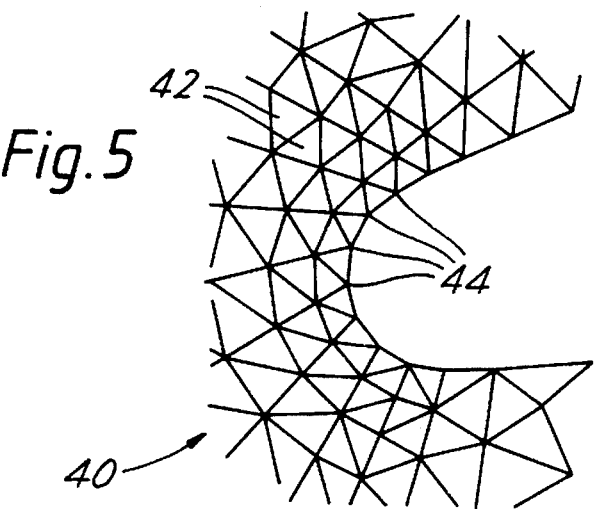
FIG. 5 is an enlargement of part of the finite element mesh at the leading edge of the radial section of the blade shown in FIG. 4.

The program incorporates the facility for changing the inlet conditions as desired. For a given set of inlet parameters, ie. air velocity and air inlet angle, the program calculates the velocity of the airflow at each point where a node 44 in the mesh 40 impinges upon the surface of the section 30. A large number of nodes 44 impinge upon the circle 20 fitted at the leading edge 19 of each of the sections 30 of the model of the blade 18. The large number of nodes 44 at the leading edge 19 of the blade section 30, FIG. 5, improves the definition of the velocity at the leading edge 19 of the blade 18. The program then plots a velocity distribution of the airflow around the section 30 for those inlet parameters.

If the inlet parameters are chosen so that the air is incident at the leading edge 19 on the concave pressure surface side 26 of the blade 18, FIG. 6, the air is said to have a high positive incidence. As the air impinges on the leading edge 19 of the radial section 30 it loses its momentum and a stagnation point S forms. The airflow then divides so that part flows in the direction of arrow A around the circle 20 at the leading edge 19 to the pressure surface 26 and the remainder flows in the direction of arrow B around the circle 20 at the leading edge 19 to the suction surface 26.

The computer program plots the velocity of the airflow travelling in the direction of arrow A to the pressure surface 26 against the distance along a reference line C, the chord. The chord C extends from the centre of curvature of the leading edge 19 to the centre of curvature of the trailing edge 21. The distance along the reference line C is expressed as a fraction of the total chord length. The velocity distribution of the airflow travelling in the direction of arrow A across the pressure surface 26 is indicated by the + points in FIG. 7. Similarly the velocity of the airflow travelling in the direction of arrow B across the suction surface 28 is plotted against the distance along the chord C. The velocity distribution around the suction surface 28 is indicated by the Y points in FIG. 7.

The velocity of the airflow builds up quickly in both directions as the air leaves the stagnation point S. The airflow has to travel further around the leading edge circle 20 to reach the suction surface 28 than it does to reach the pressure surface 26. The airflow passing from the leading edge 19 to the suction surface 28 of the blade 18 attains a higher velocity than that passing to the pressure surface 26. This results in a spike 32 in the velocity distribution of the air flowing in the direction of arrow B, indicated by the Y points in FIG. 7, from the leading edge 19 to the suction surface 28.

Figure 8:
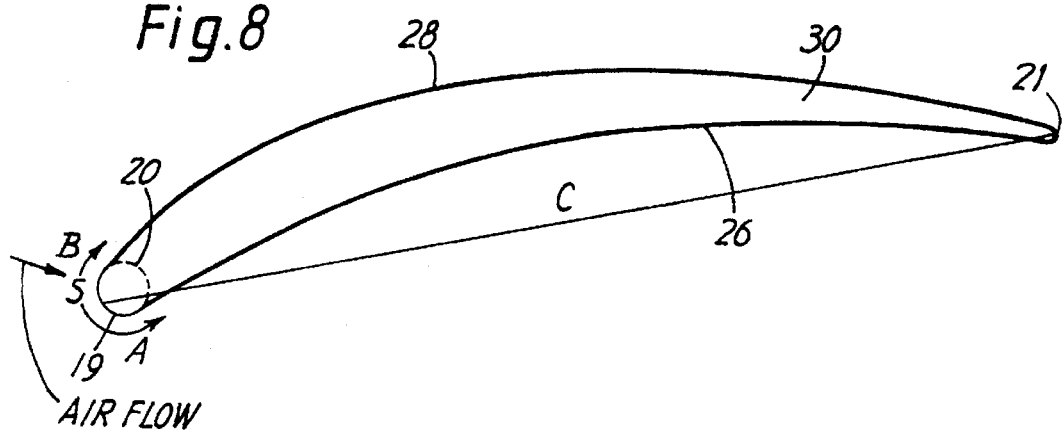
FIG. 8 is a cross-sectional view of one of the radial sections of the blade shown in FIG. 2 in which the air incident on the leading edge has a high negative incidence.
Figure 9:
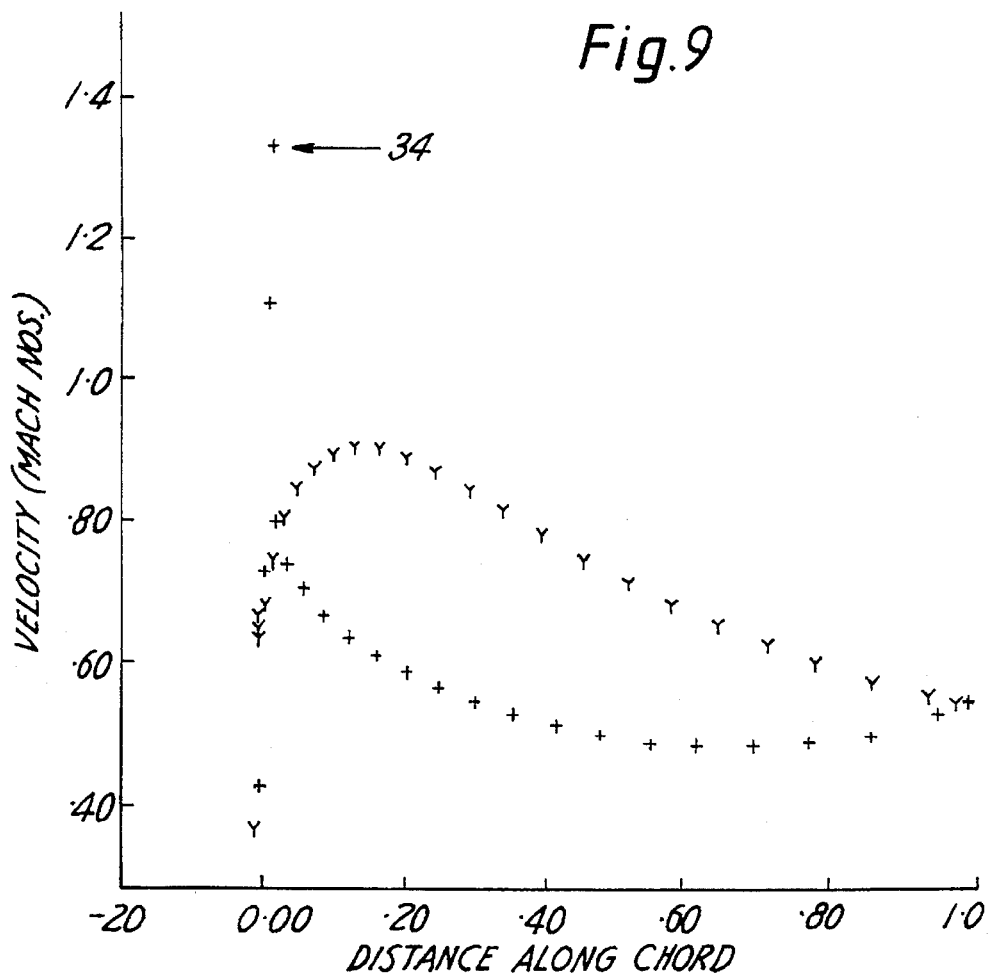
FIG. 9 is a plot of the velocity distribution of the air around the radial section of the blade shown in FIG. 8.

If the inlet parameters are chosen so that the air is incident at the leading edge 19 on the convex suction surface side 28 of the blade, FIG. 8, the air is said to have a high negative incidence. The airflow has to travel further around the circle 20 at the leading edge 19 to reach the pressure surface 26 than it does to reach the suction surface 28. The airflow at the leading edge 19 therefore attains a higher velocity as it passes to the pressure surface 26 of the blade 18. This results in a spike 34 in the velocity distribution of the air flowing in the direction of arrow A from the leading edge 19 to the the pressure surface 28. The velocity distribution of the air flowing in the direction of arrow A from the leading edge 19 to the pressure surface 28 is indicated by the + points in FIG. 9.

Figure 10:
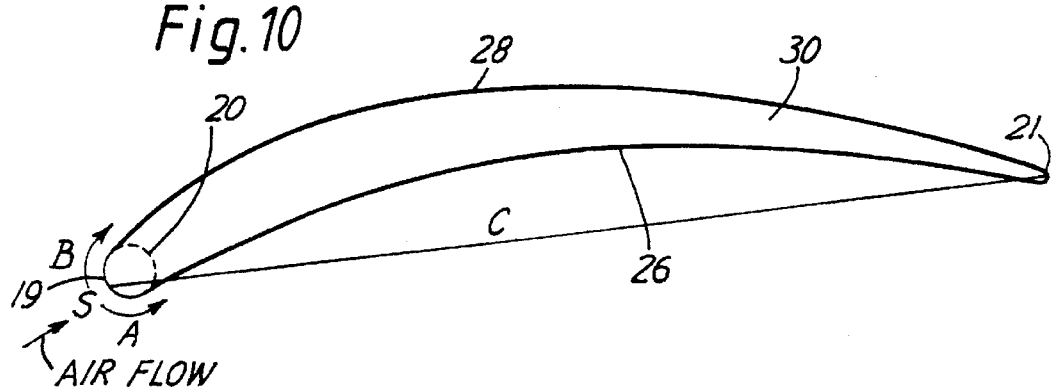
FIG. 10 is a cross-sectional view of one of the radial sections of the blade shown in FIG. 2 in which the air incident on the leading edge is at the optimum angle of incidence.

The inlet parameters are changed until the angle at which the airflow is incident on the leading edge 19 of each section 30 of the blade 18 is such that the airflow has to travel the same distance around the circle 20 at the leading edge 19 to reach the pressure surface 26 and the suction surface 28, FIG. 10. Spikes occur in the velocity distributions of the airflow passing from the leading edge 19 to both the pressure surface 26 and the suction surface 28, FIG. 11. The spikes 32 and 34 at the leading edge 19 of both velocity distributions are of equal height. This is because the airflow passing around the leading edge 19 travels the same distance around the circle 20 in both directions. The airflow passing from the leading edge 19 in the direction of arrow A therefore attains the same velocity as the airflow passing from the leading edge 19 in the direction of arrow B to the suction surface 28. The air turns smoothly attaching to the pressure surface 26 and the suction surface 28 minimising any aerodynamic losses.

The angle of incidence of the airflow is changed for each radial section 30 of the computer generated model of the blade 18 until the spikes 32 and 34 in the velocity distributions at the leading edge 19 are of equal heights. In this way the optimum angle at which the airflow is incident on the leading edge 19 can be found for each radial section 30 of the blade 18 to minimise any aerodynamic losses.

The difference between the optimum angle of incidence, calculated using the computer program, and the predicted engine inlet air angle at a predetermined operating speed is noted. The leading edge 19 of each radial section 30 is then rotated by the appropriate amount so that the airflow passing through the engine 10, at the predetermined operating speed, is incident at the leading edge 19 of each radial blade section 30 at the optimum angle. The sections 30 are disposed to define a blade 18 having a leading edge 19 with the appropriate aerodynamic profile. An appropriate mould or other manufacturing template is then produced. The airflow passing the engine at the predetermined operating speed is incident at the leading edge 19 of a blade 18, manufactured from the mould, at the optimum angle from the root 20 to the tip 22 of the blades 18 and improves the operating efficiency of the compressor.

Figure 11:
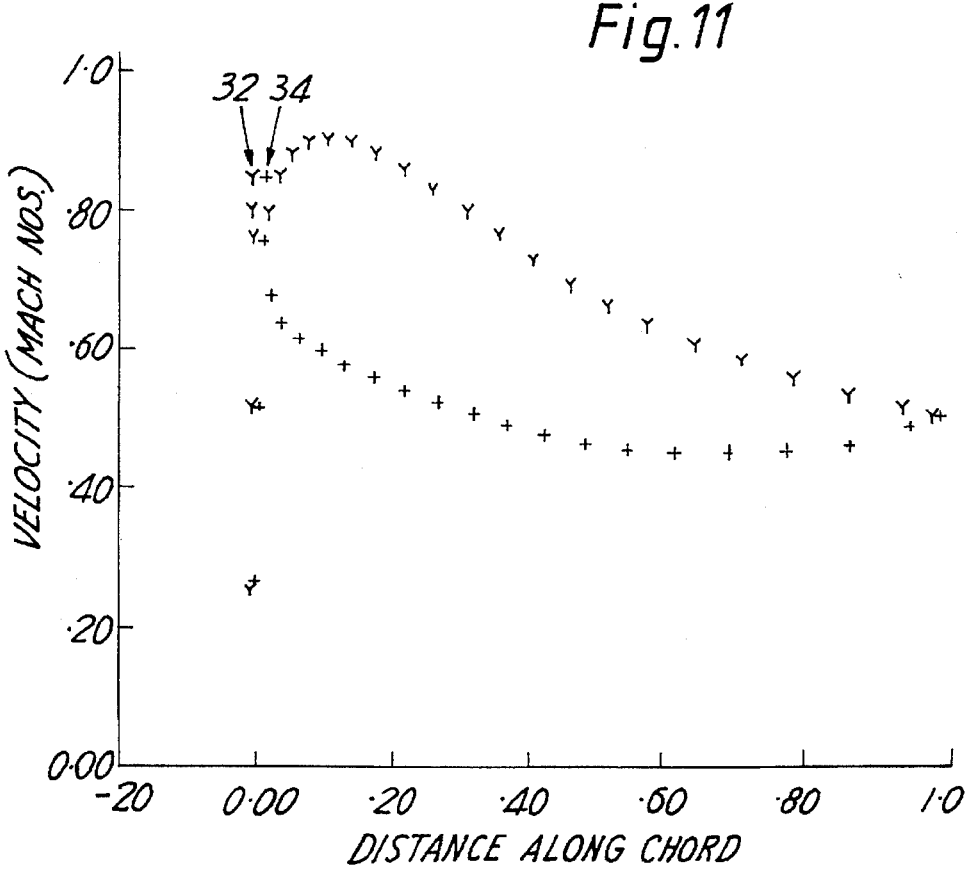
FIG. 11 is a plot of the velocity distribution of the air around the radial section of the blade shown in FIG. 10.

The velocity distribution, FIG. 11, with its associated spikes 32 and 34 provides a visual indication of incidence. This can be used to design the leading edge 19 of the blade 18 for different engine operating conditions within acceptable safety margins.

Although the present invention has been described with reference to a rotor blade it will be appreciated by one skilled in the art that it is equally applicable to the stator vanes of an axial flow compressor. This technique may also be used to set variable stators, as described in U.S. Pat. No. 4861228, at their nominal positions.

We claim:

1. An aerofoil for use in an axial flow compressor of a gas turbine engine, the aerofoil having an aerodynamic profile defined by a plurality of nominal sections stacked in a plane normal to a longitudinal axis of the engine, each section having a pressure surface and a suction surface and being arranged so that in operation a proportion of a flow of air passing through the engine is incident on an arc of a circle at the leading edge of each section, characterised in that the nominal sections, are stacked to define an aerofoil which has a leading edge profile such that at a predetermined engine operating speed the proportion of the flow of air which is incident on the leading edge circles of each section is incident at an angle at which the airflow divides so that the maximum velocity of the airflow at the leading edge circle which subsequently flows over the pressure surface of each section is equal to the maximum velocity of the airflow at the leading edge circle which subsequently flows over the suction surface of each section.

2. An aerofoil as claimed in claim 1 in which the pressure surface of each nominal section of the aerofoil is concave and the suction surface of each nominal section of the aerofoil is convex.

3. An aerofoil as claimed in claim 1 or claim 2 in which the aerofoil is a blade.

4. An aerofoil as claimed in claim 1 or claim 2 in which the aerofoil is a vane.

5. An aerofoil as claimed in claim 4 in which the vane is variable.

6. A gas turbine engine including a plurality of aerofoils as claimed in claim 1 in which the aerofoils are arranged in a circumferential array to define a stage of an axial flow compressor.

* * * * *